US005342665A

United States Patent [19]

Krawitz

[11] Patent Number: 5,342,665

[45] Date of Patent: Aug. 30, 1994

[54] BULLETIN BOARD WITH ADHESIVE ATTACHMENT STRIPS FOR MOUNTING ITEMS THEREON

[76] Inventor: Daniel S. Krawitz, 3001 Chapel Hill Rd., Orange, Calif. 92667

[21] Appl. No.: 117,297

[22] Filed: Sep. 7, 1993

[51] Int. Cl.[5] .............................................. B32B 33/00

[52] U.S. Cl. .................................... 428/40; 40/158.1; 40/600; 40/615; 40/624; 40/657; 428/41; 428/192; 428/194; 428/195; 428/201; 428/202; 428/211; 428/212; 428/213; 428/214; 428/219; 428/220; 428/354; 428/355; 428/409; 428/411.1; 428/900

[58] Field of Search .................. 428/40, 41, 192, 194, 428/195, 201, 202, 211, 212, 213, 214, 219, 220, 343, 354, 355, 409, 537.1, 411.1, 900; 40/657, 600, 615, 624, 158.1

[56] References Cited

U.S. PATENT DOCUMENTS 3,503,835 3/1970 Hermann .............................. 428/41
3,620,891 11/1971 Jones .................................... 428/41

*Primary Examiner*—Ellis P. Robinson
*Assistant Examiner*—Nasser Ahmad
*Attorney, Agent, or Firm*—Willie Krawitz

[57] ABSTRACT

A bulletin board is disclosed which employs adhesive strip elements on the front side to provide a simplified and convenient means for repeatedly attaching and removing items such as notes, schedules, coupons, pens or pencils, keys, and the like, without damaging these items and without requiring pins or tacks. Each strip element includes a tacky, adhesive portion which is coated with a non tacky tear strip that protects the adhesive portion prior to use; when the tear strip is removed, the adhesive strip becomes exposed for use. Non tacky indentations are defined between each strip element and facilitate the removal of items from the strips. The rear surface of the bulletin board may be provided with a plurality of sponge adhesives and rubberized magnets which enable the bulletin board to be attached to, easily removed from, and reattached to, various support surfaces for the bulletin board.

12 Claims, 2 Drawing Sheets

BULLETIN BOARD WITH ADHESIVE ATTACHMENT STRIPS FOR MOUNTING ITEMS THEREON

BACKGROUND OF THE INVENTION

This invention relates to a new and improved bulletin board and organizing device for refrigerators, cabinets, walls, and other surfaces. The bulletin board is designed to provide a simplified and convenient means to repeatedly attach and remove notes, schedules, coupons, calendars, and the like, without damaging the attached items or allocating time and money associated with pins or tacks that accompany traditional bulletin boards. The bulletin board may also be used to mount a holder for a key chain, pencil, pen, etc., thereby additionally functioning as an organizing device.

One type of adhesive coated bulletin board that has been used to eliminate the need for tacks or pins is produced by Minnesota Mining and Manufacturing (3M), and is marketed under the trade name of "Post-it Bulletin Board". The 3M bulletin board has its entire surface coated with an adhesive to which is adhered various papers, cardboard, etc. However, the 3M board does not allow a user to vary the level of tackiness over a given surface area. Also, the 3M bulletin board does not provide a visual reminder for determining how much useful product is remaining, or when a replacement bulletin board is necessary.

Additionally, since the 3M board is coated over its entire surface with adhesive material, attached items tend to adhere entirely rather than partially to the board surface, and this makes removal of the item cumbersome and time consuming. Moreover, the 3M bulletin board does not provide an attachment means for securing both lightweight items such as business cards, paper, etc., and also heavier objects such as pens, keys, and so forth.

Consequently, a need exists for a simple, compact and inexpensive bulletin board to which can be adhered lightweight items such as business cards, paper, coupons, etc., while. securing heavier items such as keys, pens and so forth, and without requiring pins or tacks.

Also, a bulletin board is desired in which an item can be secured, removed and reattached without requiring contact of the entire surface of the item to the adhesive surface of the bulletin board.

Additionally, it would be helpful if the bulletin board itself was easy to manufacturer, and capable of being attached to, removed from, and reattached to a support surface.

THE INVENTION

According to the invention, there is provided an improved bulletin board and organizing device for holding notes, schedules, pens, coupons, keys, and so forth. The bulletin board comprises a slightly flexible support constructed of cardboard, chipboard, heavy kraft paper, and the like. The front side of the bulletin board provides a plurality of tacky strips for adhesively attaching lightweight items such as notes, schedules, coupons, etc. Heavier items such as keys and pens may also be attached by means of superposed sponge adhesive layers that can support a suitable key chain holder and/or pen holder. The rear side of the bulletin board may be secured to a refrigerator, cabinet, wall, or other suitable surface.

The tacky strips used to attach the lightweight items comprise a series of separated, raised, longitudinal adhesive elements, each element being covered by a non-tacky, removable tear strip which functions to protect and seal the tacky portion of the strip prior to use. Removal of a single tear strip will thereby expose an individual tacky surface.

A longitudinal adhesive element may comprise a plurality of peelable adhesive layers, and each successive layer is coated with an adhesive of equal or greater tackiness. Hence forces of tension applied perpendicularly to the adhesive surface will be transmitted to the surface of the support without delaminating the strips from each other or from the bulletin board.

The number of exposed adhesive strips can be varied, and also the tackiness of individual strips can be varied, and this combination enables the user to control the overall holding power of the bulletin board. Since the useful life of the bulletin board is inversely related to the number of adhesive strips exposed over a given interval in time, by maintaining unused strips covered, the useful life of the bulletin board will be extended.

The raised surfaces of the adhesive strips define a series of indentations therebetween, with the surface of the bulletin board forming the bottom portion of an indentation. These indentations enable a user to easily remove items affixed to one or more of the strips. An item affixed to adjacent adhesive strips will bridge the indentation and thereby form a long, hollow rectangular pocket between the item and the indentation. This pocket is of sufficient width and depth to enable a user's fingernail to be readily inserted inside the pocket so that the item can be readily peeled back and removed from the bulletin board.

DESCRIPTION OF THE PREFERRED EMBODIMENTS

Figure 2:
FIG. 2 is a front external view in side elevation of the bulletin board.
Figure 4:
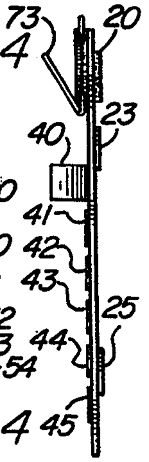
FIG. 4 is a view of the bulletin board taken along lines 4—4 of FIG. 2.
Figure 7:
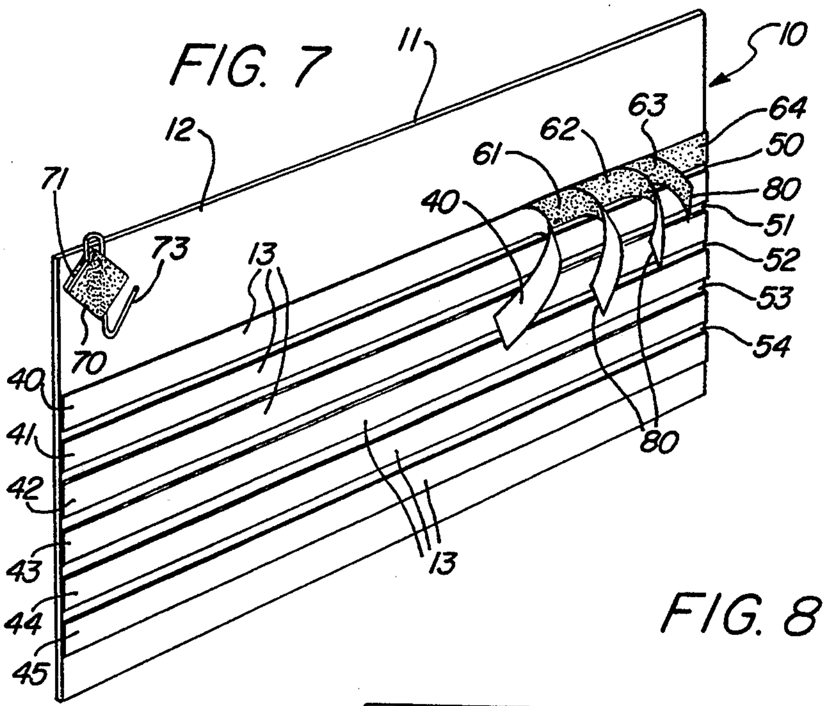
FIG. 7 is an upper perspective view of the bulletin board, showing multiple superposed layers of adhesive strip elements.
Figure 8:
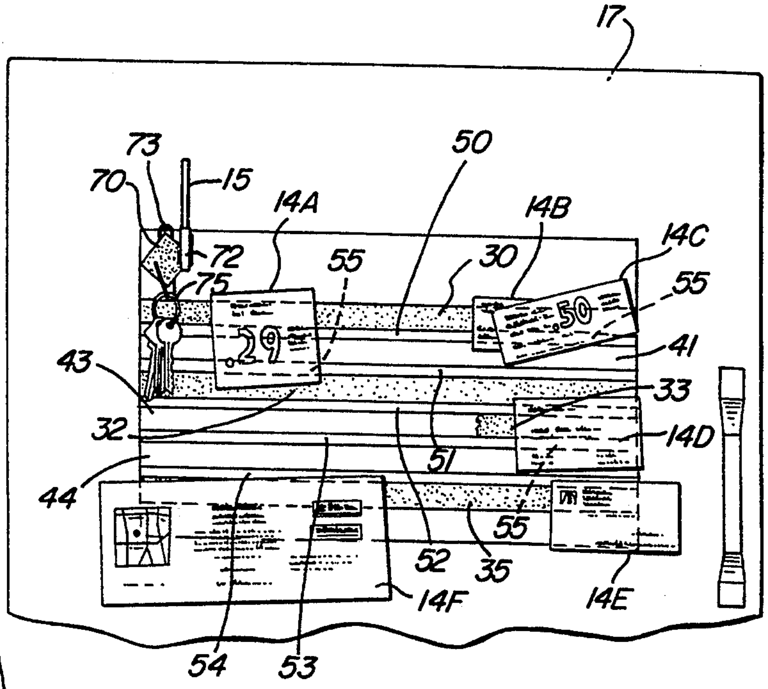
FIG. 8 is a front external view in side elevation of the bulletin board, installed on a support surface, and supporting a variety of items; and, FIG. 9 is an enlarged portion of FIG. 8 showing a key chain mounted on a support which is adhesively secured to the bulletin board.

The bulletin board and organizing device 10 of this invention as shown in FIGS. 2, 7 and 8 and comprises a thin, support 11 which is preferably slightly flexible and usually constructed of chip-board, corrugated cardboard, peg-board, wood, foam plastic, plastic, etc., and typically with a rectangular or oval shape. The front side 12 provides a plurality of strip elements 13 for adhesively attaching lightweight items (14A-14F), such as notes, schedules, business cards, coupons, etc. Heavier items may also be attached to the bulletin board such as a pen 15 and keys 15A.

Figure 6:
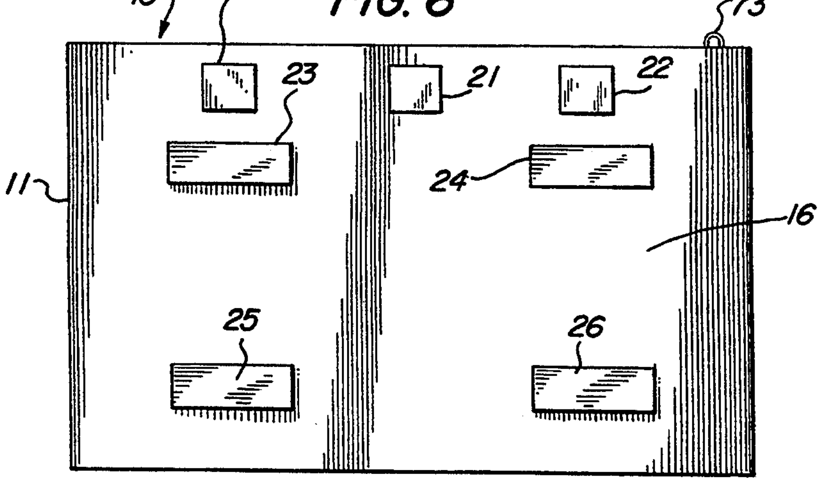
FIG. 6 is a rear external view in side elevation of the bulletin board showing a plurality of adhesive and magnetic attachment support means.

As shown in FIG. 6, the rear side 16 of the bulletin board usually employs a plurality of sponge adhesives 20, 21, 22 and longitudinal, elongated, rubberized magnets 23, 24, 25 and 26, which enable the bulletin board to be attached to, removed from, and reattached to a support surface 17. Preferably, the adhesives and magnets are of equal thickness, and they may be used in combination, as shown, or separately. Use of the magnets and sponge adhesives combined with the flexibility of the support 11 enable the bulletin board to be readily attached to a non linear surface, such as the side of a refrigerator.

The strip elements 13 shown in FIGS. 2 and 7 include a plurality of separated, raised, longitudinal tacky elements, one element 30 being shown. Each tacky element is covered by non-tacky tear strips 40 -45 which function to protect and seal the tacky element prior to use. Prior to removal, the non-tacky tear strips 40 -45 provide a visual reminder of how many tacky elements are unused and therefore available for future use. This visual reminder allows the consumer to easily determine how much useful product is remaining, and when a replacement bulletin board is necessary. FIG. 8 shows several tacky elements 30, 32, 33 and 35 which have been exposed by removal or partial removal of tear strips while non-tacky tear strips 41, 43 and 44 remain completely or partially in place prior to exposure of corresponding tacky elements.

Figure 1:
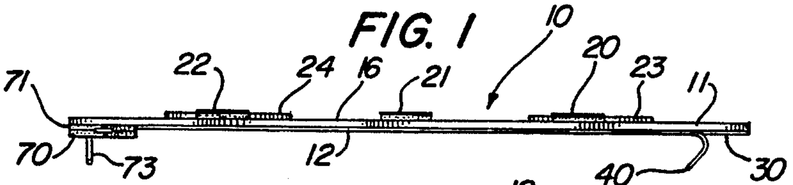
FIG. 1 is a top external plan view of the bulletin board prior to installation on a support surface.
Figure 3:
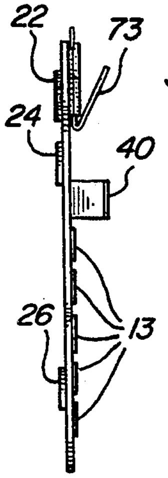
FIG. 3 is a view of the bulletin board, taken along lines 3—3 of FIG. 2.
Figure 5:
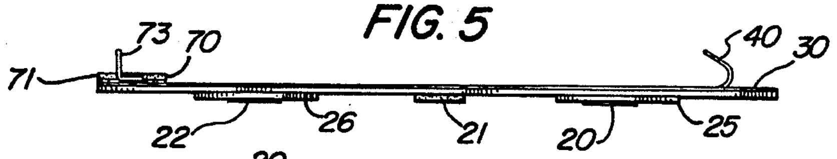
FIG. 5 is an external bottom plan view of the bulletin board prior to installation on a support surface.

As shown in FIGS. 1, 5 and 7, each tacky element is slightly raised, and a series of non-tacky indentations 50 -54 (FIGS. 2, 7 and 8) are defined between each tacky element, the front side 12 of the bulletin board 10 forming the bottom portion of an indentation. As shown in FIG. 8, when items 14A, 14B, 14C, and 14D are attached to corresponding tacky elements 30, 32, and 33 and placed across corresponding indentations 50, 51, 52, and 53, a longitudinal trough or rectangular pocket 55 is formed between the bottom portion of the indentation and the underside of the item. The pocket 55 is of sufficient width and depth to enable a user's fingernail to be inserted inside the pocket, and enables these items to be easily peeled away and removed from the bulletin board.

In an alternative embodiment as shown in FIG. 7, the strip elements 13 may be constructed of one or more layers of flexible plastic film 61, 62, 63, 64 having pull ends 80, and each successive layer of film is coated with an adhesive of equal or greater tackiness. Hence, forces of tension applied perpendicularly to the surface of a tacky element will be transmitted to the surface of the support 11 without delaminating the layers of plastic film 61 -64 from each other or from the exposed surface of the bulletin board 10.

The degree of tackiness available for a given surface area may be readily adjusted by the manufacturer. It will also be appreciated that an increase by the user in the number of tacky elements exposed, or an increase in the utilization of plastic film layers 61, 62, 63, 64 within a given tacky element will proportionately increase the tackiness available for use. However, increasing the number of tacky elements exposed, and/or the frequency in which items are attached to and removed from these exposed tacky elements, will cause a corresponding decrease in the useful life of the bulletin board.

Figure 9:
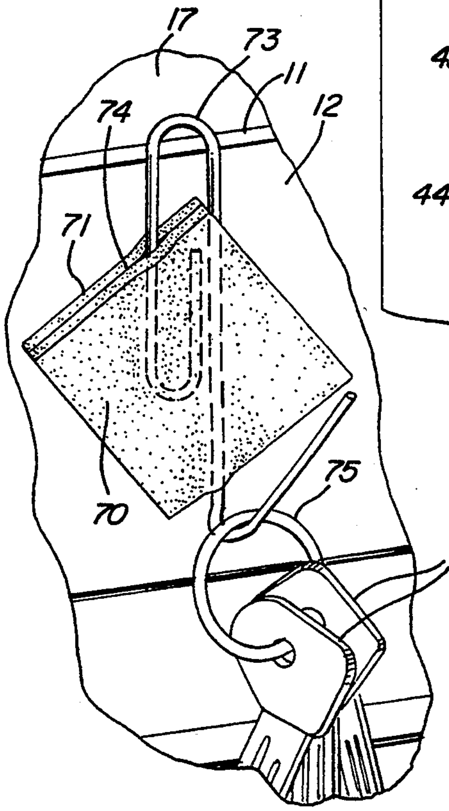

As shown in FIGS. 7 -9, the front side 12 of the bulletin board 10 may optionally include two attached, superposed sponge adhesive layers 70, 71, and the exposed upper sponge adhesive 70 supports a pen holder 72. A key chain holder 73 is secured along the interface 74, between layers 70 and 71, and supports a key chain 75. The lower sponge adhesive 71 provides a secondary and reinforcing attachment surface for the key-chain holder 73.

Typically, the dimensions of the strip elements 13 are about 0.2" to 1.75" wide, and about 3"-48" in length, and typically about 3-15 strip elements may be used on a bulletin board. The rubberized magnets 23 -26 are about 1"-3" long and about 0.5"-1.5" wide, and the sponge adhesives 20, 21, 22, and 70, 71 are preferably squares with sides ranging from about 0.5" to 1.5".

It will be appreciated that many modifications may be made in the size, shape and materials of the described bulletin board and organizing device 10, without departing from the basic spirit of the present invention. For example, a rotatable cylindrical shape support frame can be provided to accommodate several sheets of text in succession around the perimeter of the device. This orientation would allow for uninterrupted access to information on the attached items by rotating the cylindrical support to expose the next note, page of text, message, etc.

I claim:

1. A bulletin board for adhesively attaching items thereto in a generally vertical position, comprising:

a.) a flexible support member defining non-tacky front and rear sides;

b.) a plurality of separated longitudinal strips, each strip comprising two or more superimposed tacky element portions defining raised sides each of said tacky elements is covered with at least one layer of flexible plastic film of equal or greater tackiness in successive layers, and a tear strip covering said tacky element portions, each of said longitudinal strip being affixed at selected spacings to the front of the support member along the tacky element portion, each tear strip covering and sealing one or more corresponding tacky element portions prior to use, and being completely or partially removable to expose a tacky area for securing and replacing items thereto, and during removal of an item, tear strip, or tacky element, forces of tension applied perpendicularly to the surface of a tacky element are transmitted to the front side of the support member, without delaminating the tacky element portions from each other or from the front side of the support member.

2. The bulletin board of claim 1, in which the tacky elements are about 0.2" to 1.75" wide, and about 3"-48" in length, and about 3 -15 tacky elements are mounted on the bulletin board.

3. The bulletin board of claim 1, in which the rear side of the bulletin board includes attached rubberized magnets sized about 1"-3" long and about 0.5"-1.5" wide, and square sponge adhesives having sides about 0.5" to 1.5", the magnets and sponge adhesives having about the same thickness.

4. The bulletin board of claim 1, comprising a flexible support member constructed of materials selected from the group consisting of chip board, compressed cardboard, peg-board, wood, and plastic, foam plastic, corrugated cardboard and heavy kraft paper.

5. A bulletin board for adhesively attaching items thereto in a generally vertical position, and defining non-tacky front and rear sides, comprising:

a.) flexible support;

b.) a plurality of separated, longitudinal strips, each strip comprising two or more superimposed tackey element portions defining raised sides, each of said tacky element is covered with at least one layer of flexible plastic film of equal or greater tackiness in successive layers, and a tear strip covering said of the tacky element portions, each of said longitudinal strip being affixed at selected spacings to the front side of the flexible support along the tacky element portion, each tear strip covering and sealing one or more corresponding tacky element portions prior to use, and being completely or partially removable to expose a tacky area for securing and replacing items thereto; and, c.) a plurality of non-tacky indentations defined between the longitudinal strips, the indentations being formed by the raised sides of the tacky element portions and the front side of the flexible support; the items being secured to the bulletin board by attachment to a tacky element portion, and when an item is attached to an exposed tacky portion, and placed across an adjacent non-tacky indentation, an edge or trough is formed between the indentation and the underside of the attached item, the edge or trough being of sufficient size to enable a user to grasp the item from underneath, thereby enabling the item to be peeled away from the tacky element portion and removed from the bulletin board, and during removal of an item, tear strip, or tacky element, forces of tension applied perpendicularly to the surface of a tacky element are transmitted to the front side of the flexible support without delaminating the tacky element portions from each other, or from the front side of the flexible support.

6. The bulletin board of claim 5, comprising two attached, superposed upper and lower layers of sponge adhesive, and an interface being defined between the two layers, the upper sponge adhesive supporting a holder for a writing utensil, the interface providing an attachment surface for securing a key-chain holder, and the lower sponge adhesive being attached to the front side of the flexible support and providing a secondary and reinforcing attachment surface for the key-chain holder.

7. The bulletin board of claim 5, comprising means for repeated attachment and removal of a key chain and a pen or pencil.

8. The bulletin board of claim 5,in which the flexible support is constructed of materials selected from the group consisting of chip-board, compressed cardboard, peg-board, wood, plastic, foam plastic, corrugated cardboard and heavy kraft paper.

9. The bulletin board of claim 5, in which the tacky elements form a bond with an attached item selected from the group consisting of a note, schedule, coupon, business card, calendar, and combinations thereof.

10. The bulletin board of claim 5, in which the tacky elements are about 0.2" to 1.75" wide, and about 3"–48" in length, and about 3–15 tacky elements are mounted on the bulletin board.

11. The bulletin board of claim 5, in which the rear side of the bulletin board includes attached rubberized magnets sized about 1"–3" long and about 0.5"–1.5" wide, and square sponge adhesives having sides about 0.5" to 1.5", the magnets and sponge adhesives having about the same thickness.

12. The bulletin board of claim 5, providing a cylindrical shape and rotatable about a shaft.

* * * * *